United States Patent
Ishiyama (10) Patent No.: US 7,197,574 B1
(45) Date of Patent: Mar. 27, 2007

(54) DOMAIN NAME SYSTEM INQUIRY APPARATUS, DOMAIN NAME SYSTEM INQUIRY METHOD, AND RECORDING MEDIUM

(75) Inventor: Masahiro Ishiyama, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 525 days.

(21) Appl. No.: 09/671,245

(22) Filed: Sep. 28, 2000

(30) Foreign Application Priority Data

Sep. 29, 1999 (JP) .............................. 11-277462

(51) Int. Cl.
G06F 15/16 (2006.01)
G06F 15/173 (2006.01)
(52) U.S. Cl. ..................................... 709/245; 709/223
(58) Field of Classification Search ................ 709/200, 709/201–203, 206, 245
See application file for complete search history.

(56) References Cited

U.S. PATENT DOCUMENTS

| | | | | | |
|---|---|---|---|---|---|
| 6,092,100 | A * | 7/2000 | Berstis et al. | ............... | 709/203 |
| 6,298,341 | B1 * | 10/2001 | Mann et al. | .................... | 707/3 |
| 6,304,913 | B1 * | 10/2001 | Rune | .......................... | 709/241 |
| 6,560,634 | B1 * | 5/2003 | Broadhurst | ................. | 709/203 |
| 6,578,066 | B1 * | 6/2003 | Logan et al. | ............... | 718/105 |
| 6,650,748 | B1 * | 11/2003 | Edwards et al. | ........ | 379/266.04 |
| 6,857,009 | B1 * | 2/2005 | Ferreria et al. | ............. | 709/219 |
| 2004/0039798 | A1 * | 2/2004 | Hotz et al. | ................... | 709/219 |

OTHER PUBLICATIONS

Danzig et al., "An Analysis of Wide-Area Name Server Traffic", 1992, Proc. of SIGCOMM'92.*
R. Elz. et al., "Selection and Operation of Secondary DNS Servers", RFC 2182.*
P. Mockapetris, "Domain Names—Concepts and Facilities," Network Working Group Request for Comments: 1034, Nov. 1987, pp. 1-55.
P. Mockapetris, "Domain Names—Implementation and Specification," Network Working Group Request for Comments: 1035, Nov. 1987, pp. 1-55.

* cited by examiner

Primary Examiner—Krisna Lim
Assistant Examiner—Aaron Strange
(74) Attorney, Agent, or Firm—Oblon, Spivak, McClelland, Maier & Neustadt, P.C.

(57) ABSTRACT

A domain name system inquiry (DNS) apparatus and a domain name system inquiry method which are capable of obtaining a desired response at high speed even when there are a plurality of trees of domain name systems are provided. For this purpose, location information received by a current location information receiving device for receiving location information of the apparatus itself on a connected network is stored. Then, server information received by a server information receiving device for receiving server information about a DNS server to which an inquiry can be made is stored. Then, an inquiry request is transferred to at least one DNS server determined based on the location information and the server information, and based on a response therefor, the server information is rewritten, and a response result corresponding to the inquiry request is selected.

8 Claims, 7 Drawing Sheets

Fig.1

| NETWORK ADDRESS AT PRESENT LOCATION |
|---|
| A1NE1 |

Fig.2

| SERVER ADDRESS | FAILURE COUNTER | EFFECTIVE PERIOD OF SERVER |
|---|---|---|
| DA1 | 5 | ET1 |
| DE1 | 0 | ET2 |

Fig.3

| SERVER ADDRESS | FAILURE COUNTER | PRIORITY | CACHE CAPABILITY FLAG |
|---|---|---|---|
| DA1 | 5 | 1 | TRUE |
| DE1 | 0 | 1 | TRUE |

Fig.5

| CACHED TEMPORARY RESPONSE |
|---|
| (DE1,A1NE1,1,A,FOO.PRIVATE.COM,NXDomain) |

Fig.6

| TEMPORARY ID | OPTIMUM RESPONSE TERMINATION FLAG | ALL ORIGINAL INQUIRY PACKETS | SERVER INFORMATION GROUP TABLE |
|---|---|---|---|
| 1 | TRUE | (M1,M1,4321,A,FOO.PRIVATE.COM,NULL) | Fig.5 |
| 1 | FALSE | (M1,M1,4322,A,FOO.PRIVATE.COM,NULL) | Fig.5 |

Fig.4

| TEMPORARY ID | OPTIMUM RESPONSE TERMINATION FLAG | ALL ORIGINAL INQUIRY PACKETS | SERVER INFORMATION GROUP TABLE |
|---|---|---|---|
| 1 | FALSE | (M1,M1,4321,A,FOO.PRIVATE.COM,NULL) | Fig.5 |

Fig.14

| CACHED TEMPORARY RESPONSE |
|---|
| (DE1,A1NE1,1,A,FOO.PRIVATE.COM,NXDomain) |
| (DA1,A1NE1,2,A,BAR.PRIVATE.COM,A3NA1) |

Fig.7

| TEMPORARY ID | SERVER INFORMATION GROUP TABLE | TEMPORARY INQUIRY START TIME |
|---|---|---|
| 1 | Fig.5 | CT1 |

Fig.8

| TEMPORARY ID | SERVER INFORMATION GROUP TABLE | TEMPORARY INQUIRY START TIME |
|---|---|---|
| 1 | Fig.5 | CT1 |
| 2 | Fig.5 | CT2 |

Fig.9

| INQUIRY TYPE | ALGORITHM |
|---|---|
| ANY | ALGORITHM X IS USED |

Fig.12

| NETWORK ADDRESS AT PRESENT LOCATION |
|---|
| A1NA1 |

| MANAGEMENT ID | SERVER LOCATION NETWORK AREA | CURRENT LOCATION NETWORK AREA | INQUIRY TYPE | PRIORITY | CACHE CAPABILITY FLAG |
|---|---|---|---|---|---|
| 1 | NA | ANY POSITION | ANY | 1 | TRUE |
| 2 | NA | ANY POSITION | MX | 1 | FALSE |
| 3 | NE | ANY POSITION | ANY | 1 | TRUE |
| 4 | ANY POSITION | ANY POSITION | ANY | 2 | TRUE |

Fig.11

| MANAGEMENT ID | SERVER LOCATION NETWORK AREA | CURRENT LOCATION NETWORK AREA | INQUIRY TYPE | PRIORITY | CACHE CAPABILITY FLAG |
|---|---|---|---|---|---|
| 1 | NA | ANY POSITION | ANY | 1 | TRUE |
| 2 | NA | ANY POSITION | ANY | 1 | TRUE |
| 3 | ANY POSITION | ANY POSITION | ANY | 2 | TRUE |

DOMAIN NAME SYSTEM INQUIRY APPARATUS, DOMAIN NAME SYSTEM INQUIRY METHOD, AND RECORDING MEDIUM

BACKGROUND OF THE INVENTION

1. Field of the Invention

The present invention relates to a domain name system (DNS) inquiry method capable of obtaining an appropriate response at high speed in a situation in which an inquiry must be made to a tree formed of a plurality of DNS servers due to relocation, disconnection of a line, etc., in a host which uses a DNS on the Internet.

2. Description of the Related Art

In recent years, use of the computer network, the "Internet", has spread worldwide. New computer businesses have been developed using information and services which are made publicly available as a result of connection with the Internet, and conversely, by providing information and services to outside users by access via the Internet. Also, regarding Internet uses, new technological developments and expansions have occurred.

On the Internet, each computer has an identifier called an "IP address", and packets are exchanged on the basis of these IP addresses. However, an IP address is a string of numbers, and it is difficult for human beings to remember such a string of numbers; nonetheless, in order to access the computer through the Internet, the IP address must be specified. In order to solve this problem, a domain name system (DNS) has been devised. The DNS is a kind of database system, and one of the functions thereof is to mutually convert an IP address, which is a string of numbers, into a fully qualified domain name (FQDN), which is easy for human beings to remember. That is, this is equivalent to an action of searching for an IP address corresponding to the FQDN in a database system for a DNS. An application which uses the Internet usually uses this DNS so as to convert a host name (this is usually an FQDN), which is input by a user, into an IP address, and to send data packets to the target site on the Internet.

The DNS is from one point of view a distributed database. It is impossible to manage all the hosts on the Internet by one database system. For this reason, the DNS takes the form of a distributed database having a tree structure. Each DNS server generally has the following three pieces of information.

(1) Information about the server serving as a root (2) All the data of a specific domain (3) Information about the set of server to which a server itself has transferred authority, and transferred domain name An FQDN is an example of a name space having a tree structure which is divided by dots(.), for example, as in "foo.bar.com". This is a tree ".com bar foo" with the "." being the root. A leaf of a normal tree is a host name, and the other portions are called "domain mates". If a domain name "bar.com" is present on the Internet, a DNS server, which is informed of everything about the domain "bar.com", is present on the Internet.

Next, the manner in which the conversion between the domain name and the IP address is performed specifically in practice is described briefly. A DNS server which is located on the Internet in a distributed manner receives a request to convert "foo.bar.com" into an IP address from a computer which is a client. At this time, if the DNS server itself (let us assume that this is called "server A") receiving the request has all the data of "bar.com", the DNS server returns the converted result thereby. However, otherwise, the DNS server makes an inquiry to the root server. Since the root server does not have data for "bar.com", but is informed of the server which has transferred the authority of the "com" which is a branch of the tree, the root server informs the server of the server A. The server A makes an inquiry to the DNS server of "com". Since the DNS server "com" does not have the data of "bar.com", but is informed of the server which has transferred the authority of the "bar.com" which is a branch of the tree, the DNS server informs the server of the server A. The server A makes an inquiry to the DNS server "bar.com". Since the server "bar.com" has all the data about "bar.com", it is possible to convert "foo.bar.com" into an IP address. This response is returned to the server A. The server A sends this response to the client.

In the manner as described above, since the DNS performs a search by searching the tree structure, even if an inquiry is made to any DNS server on the Internet, it is possible to always obtain the same response. Based on this premise, at the present time, a mobile computer is informed of a DNS server at the nearest location, and the DNS server is used.

However, this ensuring that "the same response can be obtained" is based on the precondition that the tree formed of DNS servers is unique on the Internet. However, in recent years, with the proliferation of firewalls, there are cases in which a DNS server tree which is independent within a firewall is constructed. Also, in SOHOs (Small Office, Home Office), etc., there are cases in which, connection to the Internet is intermittent, and in a network therewithin, there are cases in which an independent root server is provided.

In a case where a plurality of root servers are present in this manner, that is, a plurality of trees of DNS servers are present, in the case of a mobile computer, even if a nearby DNS server is simply notified, the response varies depending on the tree to which that server belongs, presenting a problem. Specifically, if an FQDN is present in a certain tree and is inquired about a name server of a different tree, the response that will be returned is that such a host is not present.

There is also a system which makes inquiries to a plurality of DNS servers, and this method is a method in which inquiries are made in sequence until a server, from which a correct response is obtained, is encountered as a protocol of the DNS. In this method, since a correct response of "not found" can be obtained in a protocol of the DNS, there is a problem in that even if a plurality of DNS servers in respectively different trees are set, the response differs from the resulting determined response.

As described above, in the conventional method, in a case where there are a plurality of trees in which DNS servers are formed, the DNS server to which an inquiry should be made is unclear, and a desired response cannot be obtained.

SUMMARY OF THE INVENTION

The present invention has been achieved in consideration of the above-described circumstances. An object of the present invention is to provide a DNS inquiry apparatus and a DNS inquiry method capable of obtaining a desired response at high speed even when a plurality of DNS trees are present.

To achieve the above-mentioned object, according to one aspect of the present invention, there is provided a domain name system inquiry apparatus comprising: current location information receiving means for receiving location information of the apparatus itself on a connected network; current location management means for storing location information received by the current location information receiving means; server information receiving means for receiving server information regarding a domain name system server to which an inquiry can be made; server management means for storing server information received by the server information receiving means; request receiving means for receiving an inquiry request to a domain name system server from a client; request transferring means for transferring the inquiry request received by the request receiving means to at least one domain name system server determined on the basis of the location information and/or the server information; response receiving means for receiving a response to the inquiry request transferred by the request transferring means; server information changing means for rewriting the server information when rewriting of the server information occurs by the response received by the response receiving means; and request responding means for selecting a response result corresponding to the inquiry request on the basis of this server information and for sending the response result to the client.

As a result, there are no inquiries to DNS servers which are not most appropriate, making it possible to select a DNS server which is most appropriate for an inquiry.

Furthermore, the DNS inquiry apparatus of the present invention comprises algorithm receiving means for receiving an algorithm for selecting the response result; algorithm management means for storing the algorithm received by the algorithm receiving means; and algorithm processing section for selecting the response result in the request responding means by using the algorithm stored in the algorithm management means.

As a result, it is possible to change an algorithm when a selection is made.

Furthermore, according to another aspect of the present invention, there is provided a domain name system inquiry method comprising a first step of receiving the location information of an apparatus itself on a connected network; a second step of storing the location information received in the first step; a third step of receiving server information regarding a domain name system server to which an inquiry can be made; a fourth step of storing the server information received in the third step; a fifth step of receiving an inquiry request to a domain name system server from a client; a sixth step of transferring the inquiry request received in the fifth step to at least one domain name system server determined on the basis of the location information and/or the server information; a seventh step of receiving a response to the inquiry request transferred in the sixth step; an eighth step of rewriting the server information when rewriting of the server information occurs by the response received in the seventh step; and a ninth step of selecting a response result to the inquiry request on the basis of this server information and sending the response result to the client.

In addition, the domain name system inquiry method of the present invention comprises a tenth step of receiving an algorithm for selecting the response result; an eleventh step of storing the algorithm received in the tenth step; and a twelfth step of selecting the response result in the ninth step by using the algorithm stored in the eleventh step.

Furthermore, according to yet another aspect of the present invention, there is provided a computer-readable recording medium having a domain name system inquiry method recorded therein, the domain name system inquiry method comprising a first step of receiving the location information of an apparatus itself on a connected network; a second step of storing the location information received in the first step; a third step of receiving server information regarding a domain name system server to which an inquiry can be made; a fourth step of storing the server information received in the third step; a fifth step of receiving an inquiry request to a domain name system server from a client; a sixth step of transferring the inquiry request received in the fifth step to at least one domain name system server determined on the basis of the location information and/or the server information; a seventh step of receiving a response to the inquiry request transferred in the sixth step; an eighth step of rewriting the server information when rewriting of the server information occurs by the response received in the seventh step; and a ninth step of selecting a response result to the inquiry request on the basis of this server information and sending the response result to the client.

The above and further objects, aspects and novel features of the invention will become more fully apparent from the following detailed description when read in conjunction with the accompanying drawings.

DESCRIPTION OF THE PREFERRED EMBODIMENT

An embodiment of the present invention will now be described below with reference to the drawings.

Here, an inquiry origination source is called a "client", and a server in which a domain name system (DNS) is operating is called a "DNS server". The present invention relates to a method for relaying an inquiry to a DNS and receiving a response therefrom, and relates to an apparatus therefor.

An apparatus on the client side (mobile terminal) of this embodiment receives an inquiry issued from the client, and at the same time the apparatus makes an inquiry to a DNS server of which the apparatus on the client side is informed at that time.

Here, an inquiry issued from the client is called an "original inquiry", and an inquiry which is newly issued from this apparatus is called a "temporary inquiry". A response from the DNS server is called a "temporary response", and a response to be sent to the client is called an "optimum response".

An inquiry to the DNS is identified by an ID contained in an inquiry packet. The client recognizes the fact that a response to its own inquiry has been returned by the fact that a response containing an ID equal to the ID inquired by the client itself has been returned. That is, in the inquiry, the set of the transmission source and the ID is unique. In this apparatus, the ID of the original inquiry is called an "original ID", and the ID used for a temporary inquiry is called a "temporary ID".

Figure 1:
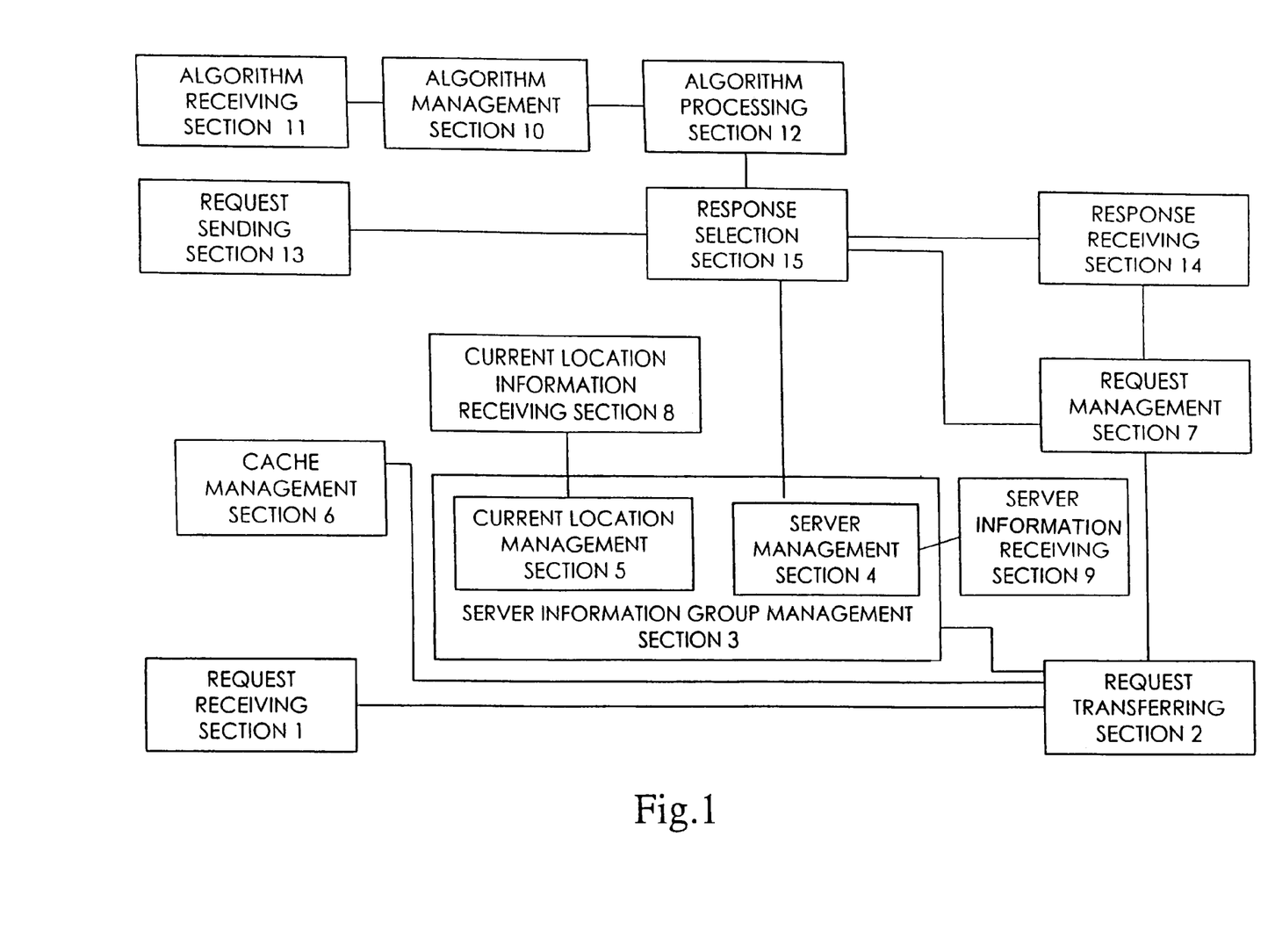
FIG. 1 is a block diagram of a DNS inquiry apparatus according to an embodiment of the present invention.

FIG. 1 shows a block diagram of this embodiment. This block diagram shows the construction of a DNS inquiry apparatus of the present invention, and it is assumed that the DNS inquiry apparatus is contained in a mobile terminal which is a client. Although a description is given here by using an example in which the DNS inquiry apparatus is contained in a mobile terminal, the construction may be formed in such a way that the DNS inquiry apparatus functions as an independent apparatus.

Referring to FIG. 1, a request receiving section 1 receives an original inquiry packet for a DNS server from the client. A request transferring section 2 transfers a temporary inquiry to the DNS server of which this apparatus is informed. A server information group management section 3 includes a server management section 4 and a current location management section 5, and manages information about DNS servers which are known at that time in a comprehensive manner. A cache management section 6 temporarily stores the result of the inquiry.

The current location management section 5 manages the location information of the network to which the mobile terminal is connected at that time. The server management section 4 manages the information about the DNS servers which are known at that time. A request management section 7 manages a temporary inquiry which is being issued at that time. A current location information receiving section 8 is a section for receiving the current location of a mobile host and for informing the current location management section 5 of that location.

A server information receiving section 9 receives information about DNS servers to which an inquiry can be made, and information therefor, and sends information about them to the server management section 4. An algorithm management section 10 manages an algorithm for selecting an optimum response on the basis of the algorithm input from an algorithm receiving section 11.

An algorithm processing section 12 selects, from the obtained temporary response, an optimum response by using the algorithm. A request sending section 13 transmits the optimum response packet to the client. A response receiving section 14 receives a temporary response. A response selection section 15 processes the obtained temporary response.

Figure 2:
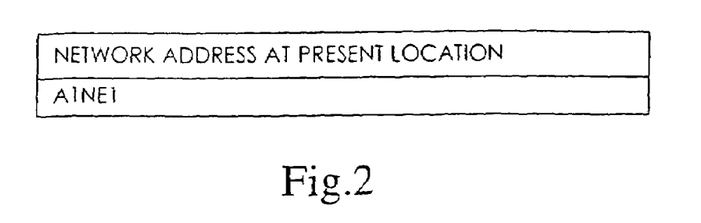
FIG. 2 is an illustration of a current position table used in the embodiment of the present invention.

The current location management section 5 is a section for managing the type of network address this apparatus and the mobile terminal, which is a client, have at that time. This information is called a "current location table". The current location table, as shown in FIG. 2, is composed of a current location address (A1NE1). Here, the number of pieces of information of the current location address may be two or more.

Figure 3:
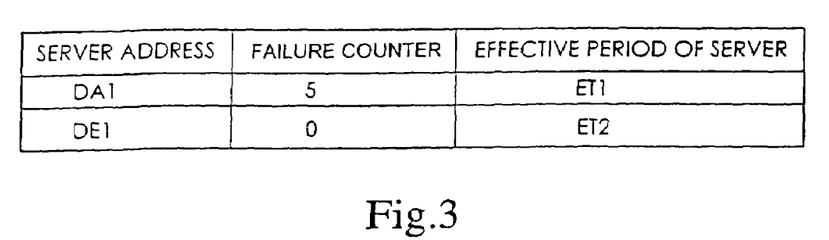
FIG. 3 is an illustration of a server management table used in the embodiment of the present invention.

The server management section 4 has a server management table for managing the DNS servers which are known at that time, and a server additional information table for managing additional information for each server. The server management table, as shown in FIG. 3, is composed of the address of a DNS server, a failure counter, and the effective period of the server.

Here, the failure counter counts the number of times failures in inquiries occurred continuously up to that time. The server additional information table is composed of a management number, a server location network area, a current location network area, an inquiry type, priority, and a cache capability flag, which are related to a DNS server.

Here, the management number is a natural number, which is unique in the table. The network area is composed of a network address and a network prefix length. If the network prefix length is 32 (in the case of IPv4), this indicates that the network address is equal to the address of the server, that is, this is additional information which is exclusively used for the DNS server.

Here, a tuple, which is additional information for the DNS server which is determined to be most appropriate, is selected.

The current location area is composed of a network address and a network prefix length. A tuple which matches the current location information is selected. In a case where a plurality of current locations are provided, a tuple in the high order of the table is selected.

Figures 4, 14:
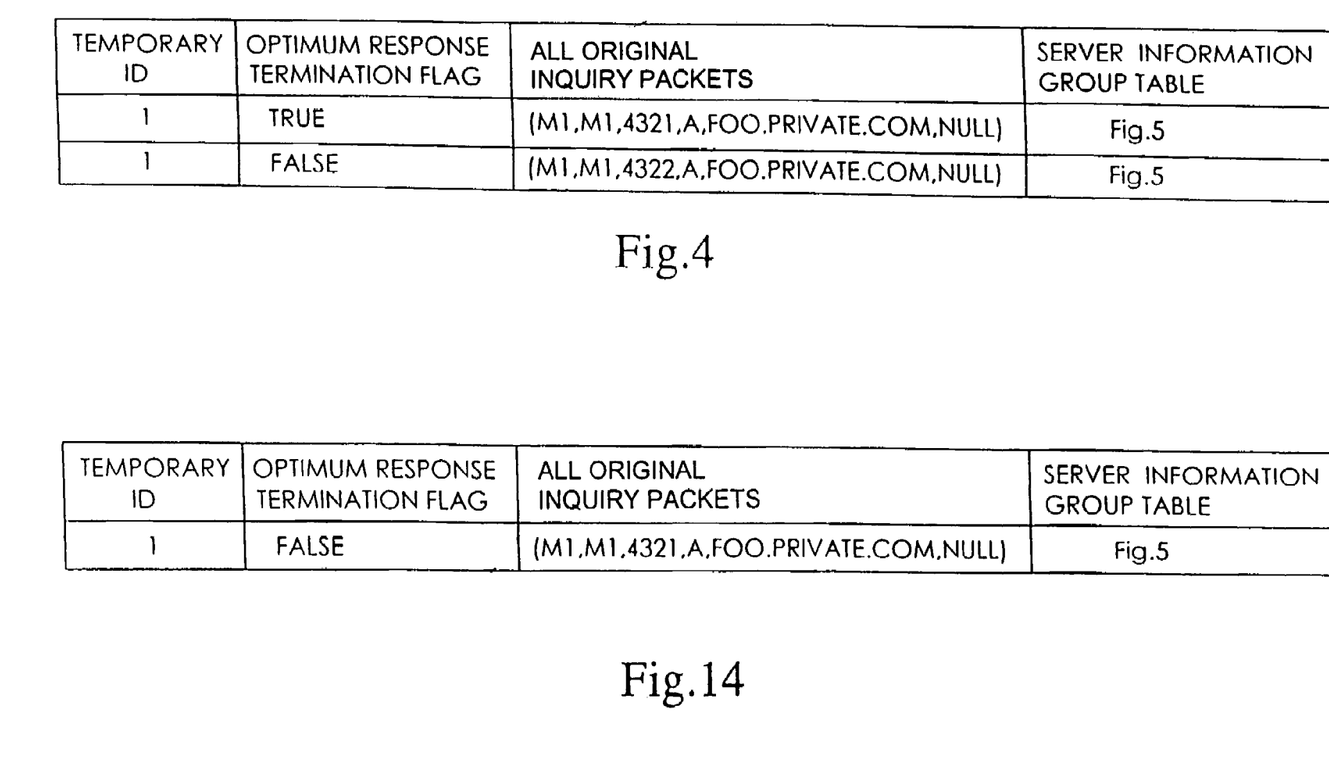
FIG. 4 is an illustration of a request management table used in the embodiment of the present invention.
FIG. 14 is an illustration of a request management table used in the embodiment of the present invention.
Figure 5:
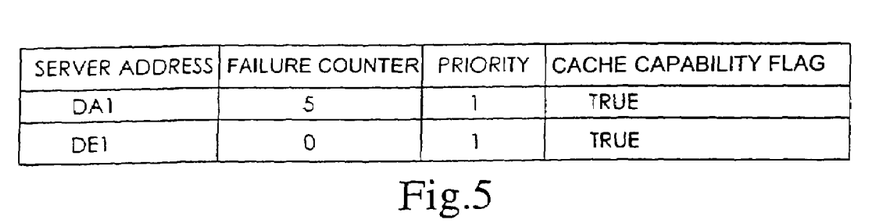
FIG. 5 is an illustration of a server information group table used in the embodiment of the present invention.

The inquiry type indicates an inquiry type of a DNS. However, an "any" type which matches any inquiry type may be specified. The priority indicates the priority of the DNS server. The cache capability flag indicates whether a response can be transferred to the cache management section A request management section 7 has a request management table for managing information for inquiries such that temporary inquiries are being made. The request management table, as shown in FIG. 4, is composed of a temporary ID, an optimum response termination flag, all original inquiry packets, and a flag indicating a server information group table. The server information group table is formed of information obtained from the server information group management section 3, and is composed of a server address, a failure counter, priority, and a cache capability flag, which are shown in FIG. 5.

The request management section 7 adds an appropriate tuple to this request management table each time a new temporary inquiry is issued. Also, the request management section 7 deletes an appropriate tuple in accordance with a request from the response selection section each time processing for a certain original response is terminated.

Figure 6:
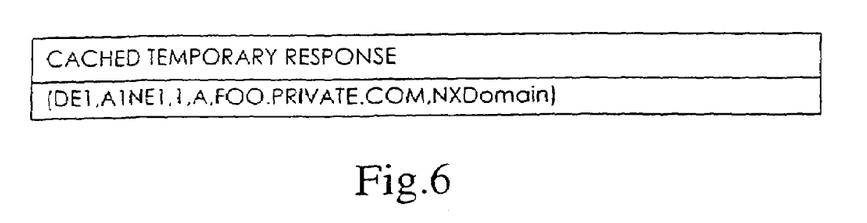
FIG. 6 is an illustration of a cache management table used in the embodiment of the present invention.
Figure 7:
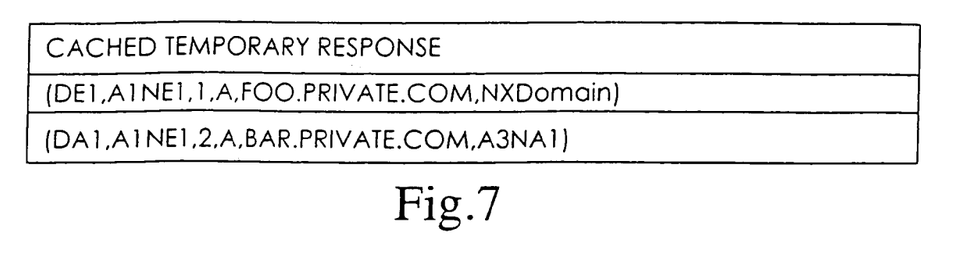
FIG. 7 is an illustration of a cache management table used in the embodiment of the present invention.

The cache management section 6 is a section for storing the obtained temporary response and deleting it as required. The cache management section 6 has a cache management table. The cache management table, as shown in FIGS. 6 and 7, is composed of a server address, all the original inquiry packets, and all the temporary response packets.

The response selection section 15 is a section for processing the obtained temporary response. The response selection section 15 has a temporary response tentative storage table and a temporary inquiry processing table. The temporary response tentative storage table is a table for temporarily storing the obtained temporary response. The temporary response tentative storage table is composed of obtained temporary response packets.

Figure 8:
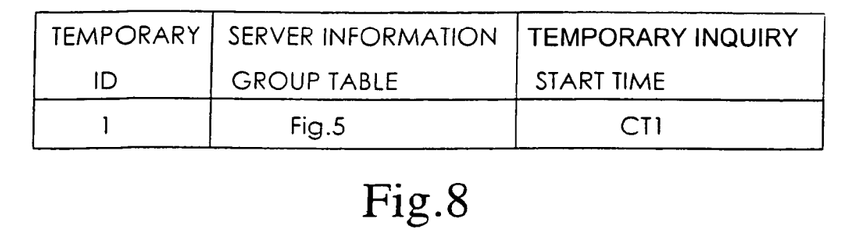
FIG. 8 is an illustration of a temporary inquiry processing table used in the embodiment of the present invention.
Figure 9:
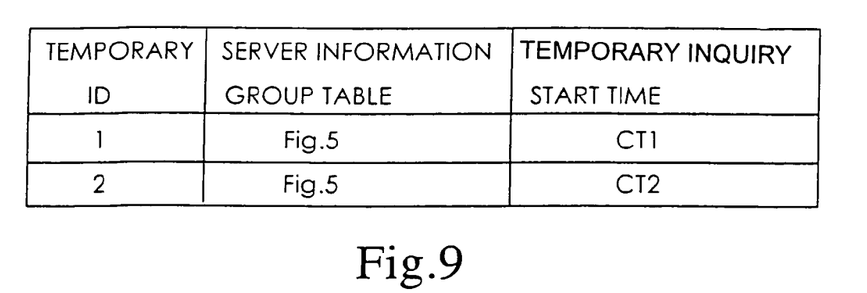
FIG. 9 is an illustration of a temporary inquiry processing table used in the embodiment of the present invention.

The temporary inquiry processing table, as shown in FIGS. 8 and 9, is composed of a temporary ID, a server information group table, and a temporary inquiry start time.

The algorithm management section 10 has an algorithm management table 12, which is an algorithm table, for managing algorithms for selecting an optimum temporary response. One algorithm for selecting the optimum temporary response is set for the inquiry type. The algorithm management table is composed of an inquiry type and an algorithm to be used. Here, in order to select the optimum temporary response, the algorithm can use the server information group table and the results of the temporary response, which have been obtained up to that time.

The operation of each section in FIG. 1 will now be described in detail.

The current location information receiving section 8 receives an address on the network to which a terminal in which this apparatus is mounted is connected at that time or a lost address. The current location information receiving section 8 notifies this address to the current location management section 5.

The current location management section 5 receives information for the current location information from the current location information receiving section, and adds a tuple to the current location management table or deletes a tuple therefrom. Also, when a current location information request is received, a duplicate of the current location management table is output to the request source.

Here, the "location information" indicates the current location address in the network to which the mobile terminal is connected at that time. In this embodiment, an IP address which is given dynamically or statically on that network is used.

The request receiving section 1 receives an original inquiry packet from the client and transfers this packet to the request transferring section 2. The request transferring section 2 receives the original inquiry packet from the request receiving section 1 and obtains an inquiry type from this packet. This inquiry type is shown to the server information group management section 3, and a server information group table is obtained. This allows the request transferring section 2 to obtain, from the server information group table, information for a group of servers to which inquiries are made.

Next, the request transferring section 2 creates one new temporary ID which is not equal to any temporary ID which is being used at that time. Then, a duplicate of the original inquiry data is created, and this temporary ID, the original inquiry data, a duplicate of the server information group table, and a creation request are transferred to the request management section 7. The request management section 7 informs the response selection section 15 of the temporary ID.

Next, the request management section 7 shows, regarding each server address within the server group table, the server address and the original inquiry data to the cache management section 6. When a temporary response packet can be obtained from the cache management section 6, a mark indicating that it is a cache is attached, the original ID within the packet is changed to a temporary ID, and this is sent to the response selection section 15.

When a temporary response packet cannot be obtained, a temporary inquiry which makes exactly the same inquiry as the original inquiry is created by using the temporary ID and this is transmitted to the server. That is, this means that, other than when the sending source for the temporary inquiry packet is a terminal in which this apparatus is operating, the other party to which an inquiry is made is a DNS server, and the ID for inquiry is a temporary ID, a inquiry packet of a DNS does not differ from the original inquiry packet.

Next, when the temporary ID, the original inquiry data, the server information group table, and a creation request are received, the request management section 7 creates a new tuple in the request management table by using them. At this time, the optimum response termination flag is set to be "false".

Also, when the temporary ID and a deletion request are received, a corresponding tuple, that is, a tuple containing the received temporary ID, is deleted from the request management table. When the temporary ID and a confirmation request are received, the request management section 7 searches the request management table for a corresponding tuple, and transmits "true" to the section which has made the request when there is a corresponding tuple and transmits "false" when there is no corresponding tuple.

Also, when the temporary ID and an optimum response termination notification are received, the request management section 7 searches the request management table for a corresponding tuple, and when there is a corresponding tuple, the optimum response termination flag of that tuple is set to be "true".

Also, when the temporary ID and a request management information request are received, the request management section 7 searches the request management table for a corresponding tuple, and returns the corresponding tuple. If there is no corresponding tuple, a null tuple is returned.

Next, when the inquiry type is received, first, the server information group management section 3 obtains the current location information from the current location management section 5. Then, a server management table is obtained from the server management section 4.

Next, the current location information and the inquiry type are shown to the server management section 4, and a sub-table of a server additional information table corresponding (that is, a set of tuples is formed in which the current location is contained most strictly in the current location area and the inquiry type is equal) thereto is obtained.

Regarding the sub-table of the server additional information table obtained here, a tuple corresponding (that is, the server address is contained most strictly in the server network area) to each server address within the server management table is obtained.

A tuple of the server group information table is created from this tuple and the tuple of the server management table, corresponding to the server address to which attention is directed at that time.

Regarding the tuple in which "any" is placed in the inquiry type, the tuple is changed to the inquiry type at that time. Eventually, a tuple of the server group information table is created for each server address within the server management table, and this becomes a server group information table.

Here, a tuple in which the priority is "0" is deleted. The obtained server group information table is output to the request source.

The server management section 4 adds or deletes an appropriate tuple of the server management table in accordance with an addition or deletion request from the server information receiving section 9. Also, the server management section 4 adds or deletes an appropriate tuple of the server additional information management table in accordance with an addition or deletion request for the server additional information from the server information receiving section 9.

When there is a request for the server management table, the server management section 4 makes a duplicate of the server management table and outputs it to the request source. Also, the server management section 4 checks the server management table periodically, and deletes a tuple whose effective time has expired at the time it is checked.

Next, when the server address and a failure-counter-increase request for a server are received, the server management section 4 increments the failure counter of the specified server by one. Also, when the server address and a failure-counter-erasure request of a server are received, the server management section 4 sets the failure counter of the specified server to zero.

When there is a request for the current location information, the inquiry type, and the server additional information table, the server management section 4 obtains a duplicate of a tuple (in which the inquiry type and the current location information are contained in the current location area) for each tuple within the current location information table regarding each tuple within the server additional information table.

At this time, there must be one tuple for one server location network area. If there are a plurality of tuples in one server location network area, the inquiry type is checked first. If there is a tuple of an inquiry type equal to the inquiry type in which the inquiry type is shown to be "any type" in one server location network area, the tuples of "any type" are deleted.

In one server location network area, when there are a plurality of tuples in which the current location area contains one current location address within the current location information table, the tuple of the narrowest area is made to remain, and the rest are deleted.

However, when there are a plurality of tuples in one server location network area, the tuple having the smallest management number area is made to remain, and the rest are deleted.

A sub-table of the server additional information table created thereby is transferred to the request section.

When the temporary response packet is received, the response receiving section 14 obtains a temporary ID of the temporary response from the received temporary response packet. The response receiving section 14 transmits the temporary ID and a confirmation request to the request management section 7. When the response is "true", the temporary response packet is transferred to the response selection section. If the response is "false", the temporary response packet is discarded.

When the temporary ID is received, the response selection section 15 transfers the temporary ID and a request management information request to the request management section, and request management information is obtained. A tuple of a temporary inquiry processing table is created based on the server information group table within the obtained request management information and the current time, and is added to the temporary inquiry processing table.

Also, the response selection section 15 checks if there is a tuple of the temporary inquiry processing table, in which a fixed period has elapsed. This period is programmable, and a user can specify it. If there is a tuple in which a fixed period has elapsed, a temporary ID is obtained first for each tuple.

All the temporary responses which match the temporary ID are first taken out from the temporary response tentative storage table.

A server group table is obtained from the tuple in which a fixed period has elapsed. A server, which is in the server group table and for which a temporary response is not obtained, is checked, and for each of these servers, a failure-counter-increase request of the server is transmitted to the server management section 4.

Initially, all the temporary responses matching the temporary ID are deleted from the temporary response tentative storage table. The temporary ID and a request management information request are transferred to the request management section 7 so as to obtain request management information. An optimum request termination flag in the request management information is confirmed.

Here, if the optimum request termination flag is "false", a server failure response corresponding to the original inquiry packet is created, and this is transferred to the request sending section 13.

Then, the temporary ID and a deletion request are shown to the request management section 7, and a tuple of the target temporary inquiry processing table is deleted.

When the temporary response is received, the response selection section 15 obtains the temporary ID from the received response.

A tuple of the corresponding temporary inquiry processing table is obtained from the temporary ID. A request for a server management table is made to the server management section 4. The value of the failure counter for each server within the server information group table within the tuple of the temporary inquiry processing table is updated from the obtained server management table.

If the temporary response is not obtained from the cache, the content of the temporary response is not in error, and a cache capability flag matching the DNS server which has transmitted the temporary response within the server group table within the tuple of the temporary inquiry processing table is "true", a duplicate of the obtained temporary response is transferred to a cache management section. The obtained temporary response is added to the temporary response tentative storage table. The temporary ID and a request management information request are transferred to the request management section so as to obtain request management information. If the optimum response termination flag of the request management information is "true", the processing is terminated. All the temporary responses matching the temporary ID are taken out from the temporary response tentative storage table by making a duplicate thereof.

The obtained temporary response set and the duplicate of the server information group table are transferred to the algorithm processing section, and waiting for a response is performed. If the response of the algorithm processing section is null, since this means that an optimum temporary response is not yet obtained at that time, this processing is terminated. If the response of the algorithm processing section is one element of the set of transferred temporary responses, this means that the obtained temporary response is an optimum temporary response.

Regarding the temporary ID which is being processed at that time, all the temporary responses equal to this temporary ID, which are in the temporary response tentative storage table, are deleted. The temporary ID and an optimum response termination notification are shown to the response management section. The temporary ID and a request management information request are shown to the request management section 7 in order to obtain request management information. An optimum response to be transmitted to the client is created from the obtained request management information and the temporary ID. That is, of the optimum temporary response, the temporary ID is changed to the ID of the original inquiry packet so that the transmission source and the receiving destination are reversed compared to those of the original inquiry packet. Then, the created optimum response is transferred to the request sending section 13.

The request sending section 13 transmits the received optimum response to the client.

The algorithm management section 10 adds or deletes an appropriate tuple to the algorithm table in accordance with an algorithm addition or deletion request from the algorithm receiving section 11.

When the inquiry type and the algorithm request are received, the algorithm management section 10 transfers them to the section which has made a request for a tuple whose inquiry type is equal. If there is no tuple whose inquiry type is equal, a tuple of "any type" is transferred.

When a set of temporary responses is received, the algorithm processing section 12 checks the inquiry type, and shows the inquiry type and the algorithm request to the algorithm management section 10 in order to obtain an algorithm. By using the algorithm obtained here, it is determined whether the optimum temporary response is present within the set of received temporary responses. When the optimum temporary response is present within the set of received temporary responses, the optimum temporary response is transferred to the section which has made the request, and the rest is discarded.

When the optimum temporary response is not present within the set of received temporary responses, a null is returned to the section which has made the request, and the received temporary responses are discarded.

The cache management section 6 checks a cache table periodically, and searches for cache data whose effective period has expired. The cache data whose effective period has expired is deleted from the cache table. Also, when the server address and the inquiry type are shown, the cache management section 6 searches the cache table for a temporary response in which the transmission party is equal to the server address and the inquiry type is equal. When there is a matching temporary response, a duplicate thereof is returned to the section which has made the request. If there is no matching temporary response, a null is returned to the section which has made the request.

Also, when a response packet is received, the cache management section 6 adds this response to the cache table.

Figure 10:
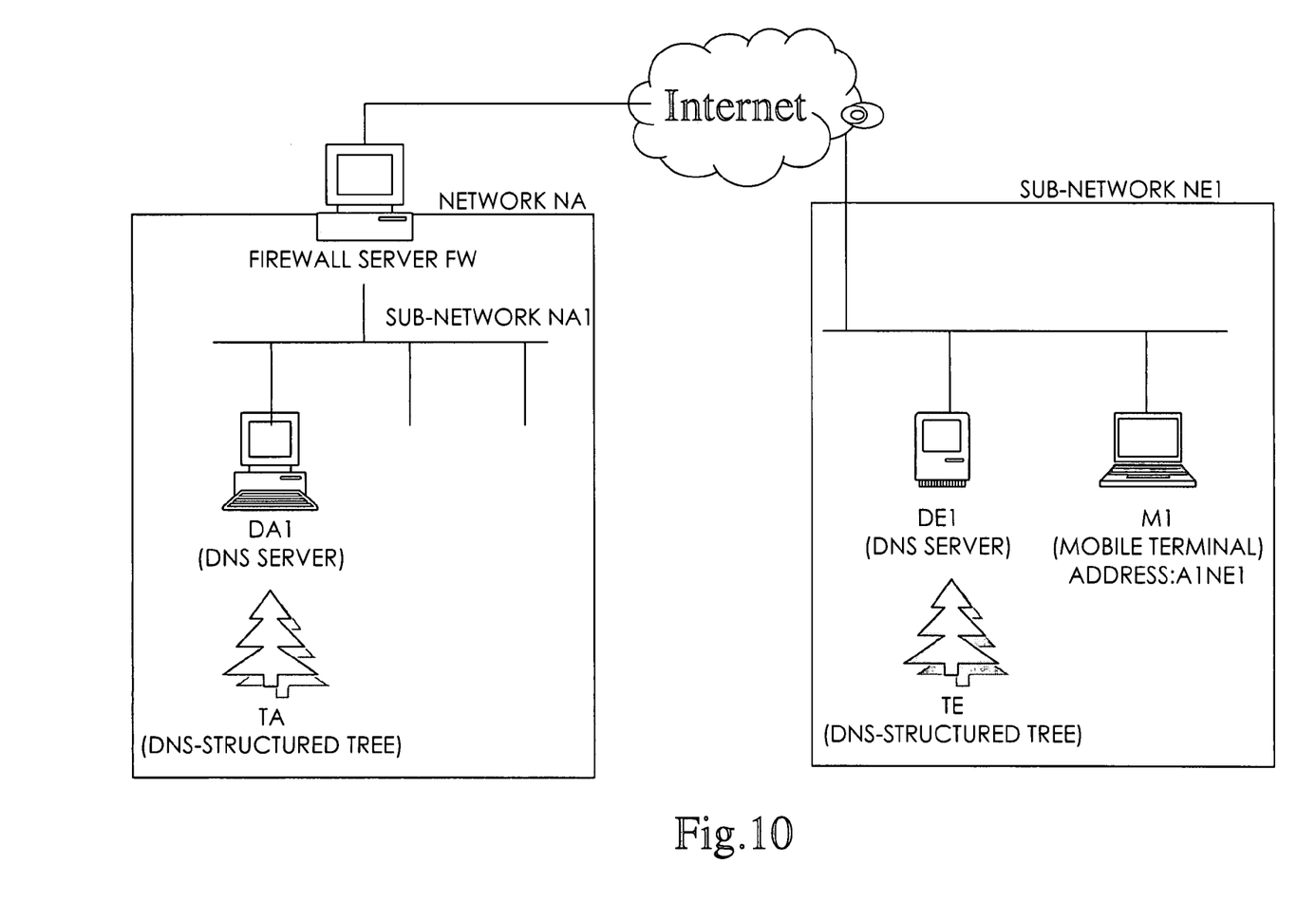
FIG. 10 is a configuration diagram of a computer network used in the embodiment of the present invention.

Next, an example of the construction of a computer network in which the present invention is used is shown in FIG. 10.

A sub-network NE1 is a sub-network which belongs to an open network (for example, the Internet) to which a plurality of organizations are connected.

Reference letter DE1 denotes a DNS server on an external network. A tree, in which DNS servers are formed, to which the external network belongs, is denoted as TE. A DNS server DE1 belongs to the DNS-structured tree TE.

In contrast, reference letter NA denotes a network (private.com) protected by a firewall server FW.

The firewall server FW is connected to the external network (for example, the Internet). Here, it is assumed that an access to the firewall server FW from the outside cannot be made.

The structured tree of the DNS servers DA1 and DA2 (not shown) inside this network NA is terminated in the network NA. This structured tree is denoted as TA. Reference letters NA1 and NA2 denote sub-networks belonging to the network NA. The DNS servers DA1 and DA2 (not shown) belong to the same structured tree TA.

Reference letter M1 denotes a mobile terminal which can be moved on the network. The mobile terminal M1 is a terminal having a DNS server inquiry function. It is assumed that the mobile terminal M1 is connected to the sub-network NE1 at that time, and that a dynamic or static address A1NE1 is obtained.

In this embodiment, it is assumed that "private.com" is a domain name belonging to only the DNS-structured tree TA and is a domain name which can be used only in the network NA, and only a response of NXDomain (means "not known") can be obtained even if an inquiry is made to another DNS-server-structured tree.

In this embodiment, the inquiry packet of the DNS is abbreviated and denoted by the seven values of the transmission party, the destination server, the ID, the inquiry type, the inquiry data, and the response data. The table held by each section of this apparatus in this state is as described below.

The current position table is shown in FIG. 2. That is, the address indicating the current position of this terminal is A1NE1. The server management table is shown in FIG. 3. That is, this terminal knows DA1 and DA2 as the DNS servers to which inquiries can be made. Also, the DNS server DA1 has failed in inquiries five times continuously up to that time.

The effective period of the server DA1 in this terminal is a time ET1. When the server information is not updated by this date, the tuple of this server is deleted from the server management table.

Figure 11:
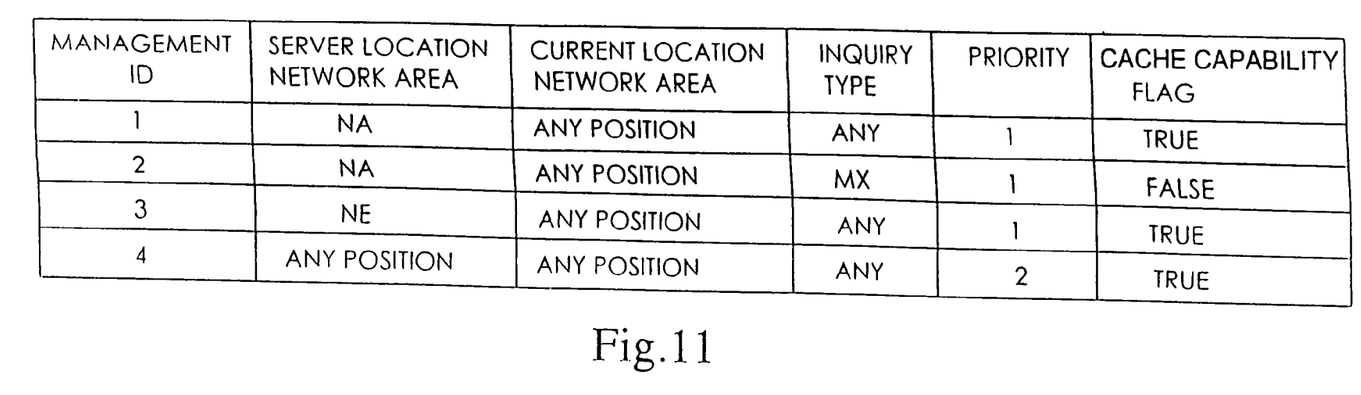
FIG. 11 is an illustration of a server additional-information table used in the embodiment of the present invention.

The server additional-information table is shown in FIG. 11. The server additional-information table is composed of the network area where the DNS server is positioned, the network area of the current position of this terminal, the inquiry type of each DNS server, the priority, and the cache capability flag.

The request management table is null at that time. That is, this means that any processing is not being performed at this time. In a similar manner, the cache management table, the temporary response tentative storage table, and the temporary inquiry processing table are set to be null.

Figure 12:
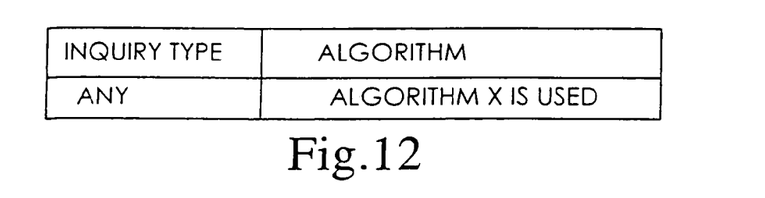
FIG. 12 is an illustration of an algorithm management table used in the embodiment of the present invention.

The algorithm management table is shown in FIG. 12. This shows that a specified algorithm X is used for any inquiry type.

Here, as an example, the algorithm X is defined as follows. A temporary response is defined as a "good temporary response", in which the content of the temporary response is not NXDomain (means that it is correct as a response, but the server does not know the answer of the question), AnswerRR is not 0 (an effective answer is not contained in the response, and only reference information is contained), and the temporary response is not in error. If the temporary response is a good temporary response among the obtained temporary response, and a server having a priority higher than that of the server which responded with the good temporary response is not in the server management table or the temporary response of that server having the higher priority is not a good temporary response, the temporary response from that server is most appropriate. Also, if every obtained temporary responses is not "good temporary response", and if all the temporary responses of all the servers in which the failure counter is equal to or smaller than a set value are held, the optimum response becomes that temporary response if NXDomain is present in the obtained temporary response. Also, if there is a temporary response, in which AnswerRR is 0, among the obtained temporary responses, the optimum response becomes that temporary response, and if all the obtained temporary responses are in error, the error becomes the optimum temporary response. If all the temporary responses of all the servers in which the failure counter is 3 or less are not held, since the optimum response cannot be determined yet, a null is returned.

This algorithm can be appropriately changed to another algorithm received from the algorithm receiving section 11.

Here, a terminal M1 makes a DNS inquiry in order to know the address for the name of "foo.private.com". This inquiry packet is written as (M1, M1, 4321, A, foo.private.com, null).

This apparatus contained in the mobile terminal M1 receives this packet by the request receiving section 1. This packet is sent to the request transferring section 2. The request transferring section 2 obtains an inquiry type "A" from this packet.

Next, this inquiry type "A" is shown to the server information group management section 3 so as to make a request for a server information group table.

The server information group management section 3 receives this inquiry type "A" and creates a server information group table. Initially, a request for current location information is made to the current location information receiving section 8.

The current location information receiving section 8 returns the current position from the current position table shown in FIG. 2. Then, the server information group management section 3 obtains a server management table shown in FIG. 3 from the server management section 4.

Next, the server information group management section 3 shows the current location information and the inquiry type "A" to the server management section 4 so as to make a request for a sub-set of the server additional-information table.

Receiving this request, the server management section 4 creates a sub-set of the current server additional-information table shown in FIG. 11. This result is shown in FIG. 13, and this is returned to the server information group management section 3.

Figure 13:
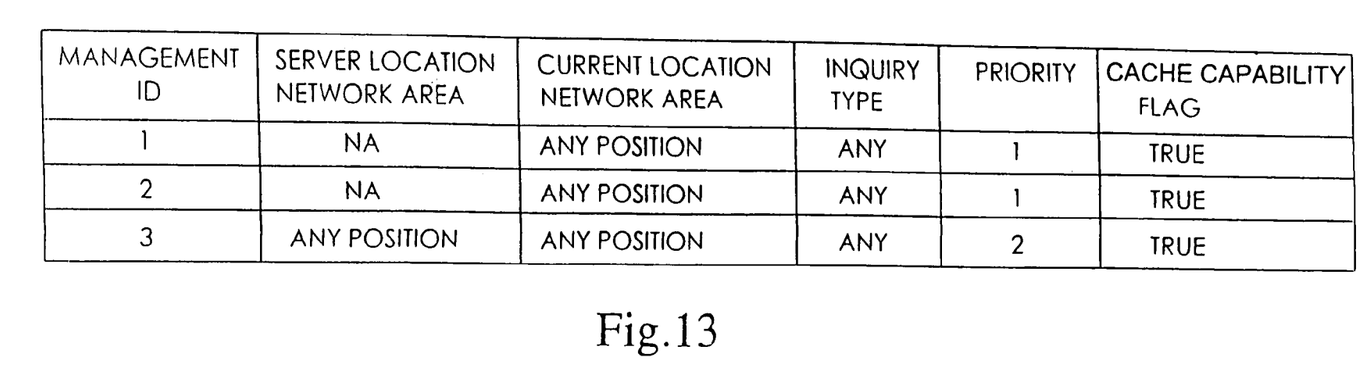
FIG. 13 is an illustration of a server additional-information table used in the embodiment of the present invention.

Next, the server information group management section 3 creates a server information group management table from the obtained server management table (FIG. 3) and the sub-set of the server additional-information table (FIG. 13). The obtained server information group management table is shown in FIG. 5, and this is returned to the request transferring section 2.

The request transferring section 2 creates a temporary ID. Here, it is assumed that "1" is assigned as the temporary ID. The request transferring section 2 transfers the created temporary ID "1",) the original inquiry (M1, M1, 4321, A, foo.private.com, null, and the obtained server group management table (FIG. 5) to the request management section 7 so as to create a request management table.

Receiving this creation request, the management section 7 adds a new tuple to the request management table.

As a result, the request management table becomes as shown in FIG. 14.

The request transferring section 2 transmits the created temporary ID "1" to the response selection section 15. The response selection section 15 shows the temporary ID "1" to the request management section 7 so as to make a request for request management information. Receiving this request, the request management section 7 returns a tuple having the temporary ID "1" within the request management table.

More specifically, this is a line of the temporary ID "1" in FIG. 14. Receiving this tuple, the response selection section 15 adds a new tuple to the temporary inquiry processing table.

When the current time is assumed to be "CT1", the temporary inquiry processing table becomes as shown in FIG. 8. The request transferring section 2 makes an inquiry to the cache management section 6 about whether or not there is a response to the original inquiry (M1, M1, 4321, A, foo.private.com, null) with regard to each server, that is, DA1 and DE1, on the basis of the obtained server group management table (FIG. 5).

Since the cache table is null, the cache management section 6 returns a null to inquiries for both. Since the response from the cache management section 6 is a null, the request transferring section 2 creates temporary inquiries with regard to DA1 and DE1. There are two temporary inquiries which are created: (A1NE1, DA1, 1, A, foo.private.com, null) and (A1NE1, DE1, 1, A, foo.private.com, null).

At that time, since the terminal M1 is outside the protection area of the firewall server FW, and arrival at the DNS server DA1 is impossible, a response from the DNS server DA1 is not received.

The packet can reach the DNS server DE1 from the terminal M1. However, since "private.com" belongs to only the DNS-structured tree TA, the DNS server DE1 belonging to the DNS-structured tree TA cannot obtain an answer for "private.com". Therefore, the response of the DNS server DE1 becomes (DE1, A1NE1, 1, A, foo.private.com, NXDomain).

When the response of the DNS server DE1 reaches the terminal M1, the response receiving section 14 receives this response. The response receiving section 14 checks the temporary ID from the received packet, and makes an inquiry to the request management section 7 about whether or not the obtained temporary ID "1" is present in the request management table.

Since the temporary ID "1" is present in the request management table, this temporary response is transferred to the response selection section 15. The server management section 4 outputs the address of the DNS server DE1 and a failure-counter-erasure request of this server, and sets the failure counter of the DNS server DE1 to zero.

The response selection section 15 receives the temporary response and obtains the temporary ID. A tuple corresponding to the temporary ID is obtained from the temporary inquiry processing table (FIG. 8). Also, the server management table is obtained, and the failure counter is updated. Here, since the cache capability flag with regard to the DNS server DE1 within the server group management table within the temporary inquiry processing table is "true", a request is made to the cache management section 6 so that this temporary response is cached. As a result, the cache table becomes as shown in FIG. 6.

Next, a request for a tuple of the request management table for the temporary ID "1" is made to the request management section 7. Here, since the optimum response termination flag is "false", the response selection section 15 adds this temporary response to the tentative storage table.

Next, a temporary response for the temporary ID "1" is duplicated from the temporary response tentative storage table. As a result, (DE1, A1NE1, 1, A, foo.private.com, NXDomain) is obtained. A set of these temporary responses and the server information group management table (FIG. 5) are transferred to the algorithm processing section 12.

The algorithm processing section 12 obtains the inquiry type "A", shows this to the algorithm management section 10, and obtains an algorithm. Although the temporary responses from all the servers are not received, since the failure counter of the DNS server DA1 is 5, which exceeds 3 defined by the algorithm, (DE1, A1NE1, 1, A, foo.private.com, NXDomain) becomes the optimum response.

Therefore, here, (DE1, A1NE1, 1, A, foo.private.com, NXDomain) is returned to the response selection section 15. Since the temporary optimum response is obtained, the response selection section 15 first deletes the temporary response matching the temporary ID "1" from the temporary response tentative storage table.

As a result, the temporary response tentative storage table becomes null. Next, the request management section 7 is informed of the optimum response termination of the tuple of the request management table for the temporary ID "1". This causes the optimum response termination flag of the tuple of the request management table for the temporary ID "1" becomes "true".

Next, the temporary optimum response is converted into an optimum response. This causes the optimum response to become (M1, M1, 4321, A, foo.private.com, NXDomain).

This optimum response is transferred to the response selection section 15. Thereafter, it is assumed that the terminal M1 connects to the network NA1 by using a modem, etc., while holding the address A1NE1, and an address A1NA1 is obtained.

Figure 15:
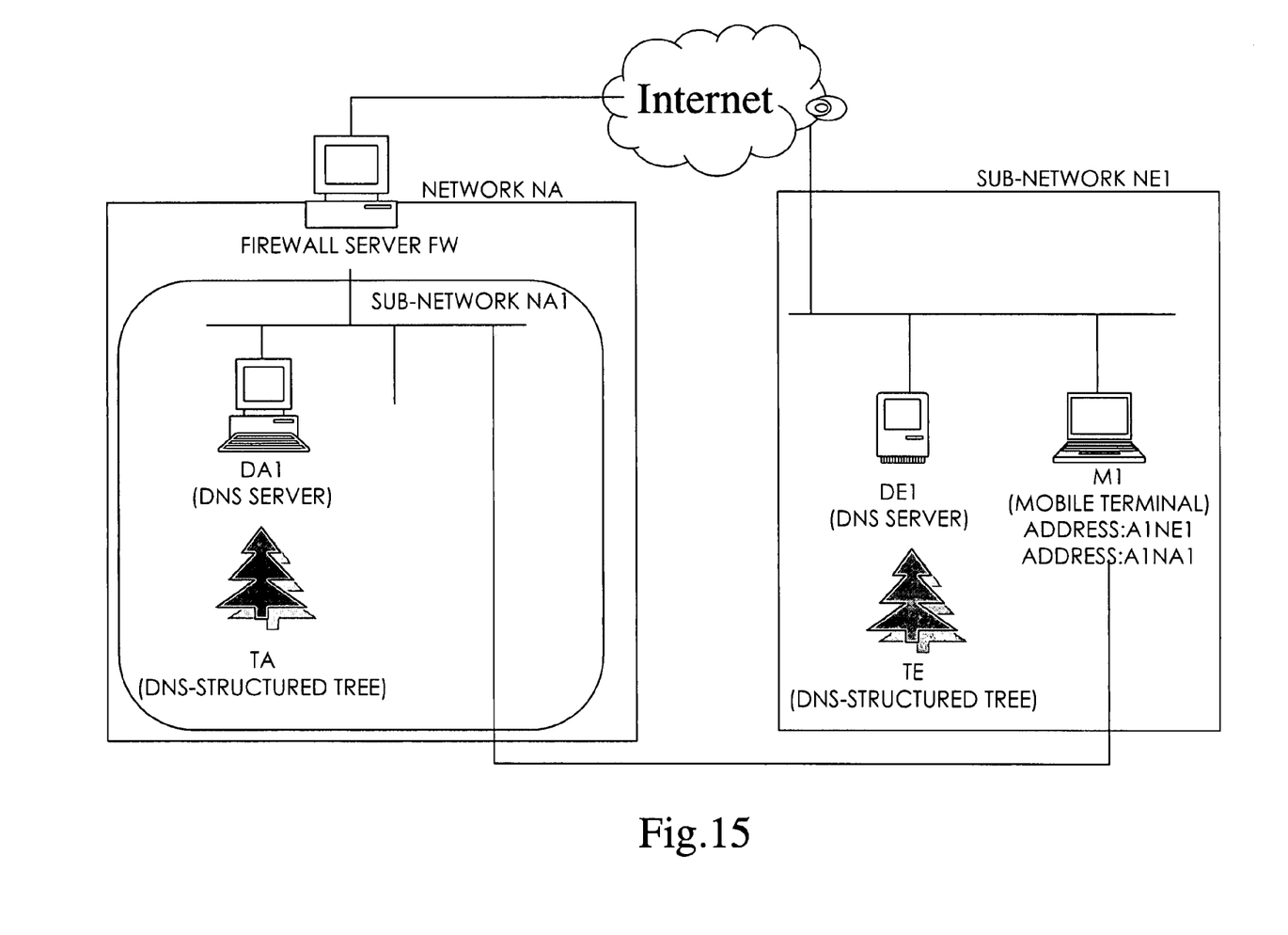
FIG. 15 is a configuration diagram of a computer network used in the embodiment of the present invention.
Figure 16:
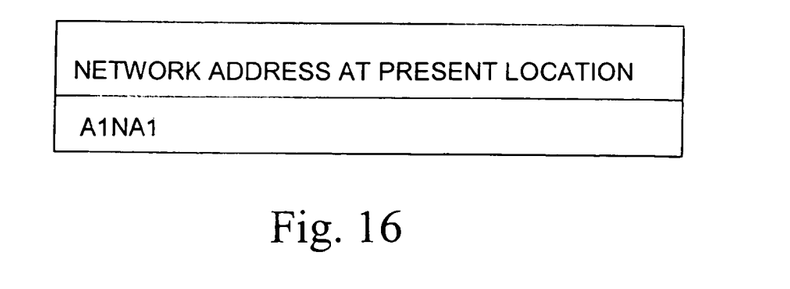
FIG. 16 is an illustration of a current position table used in the embodiment of the present invention.

The network configuration diagram in this case is shown in FIG. 15. At this time, the current position table becomes as shown in FIG. 16.

It is assumed that, in this state, the terminal M1 makes a DNS inquiry to know the mail exchange address for the name of "bar.private.com". This inquiry packet is assumed to be (M1, M1, 4322, A, bar.private.com, null).

A DNS server inquiry apparatus contained in the terminal M1 receives this packet by the request receiving section 1. This is transferred to the request transferring section 2.

The request transferring section 2 obtains the inquiry type "A" from this packet, and shows this inquiry type "A" to the server information group management section 3 so as to make a request for a server information group table. This result becomes as shown in FIG. 5 in a manner similar to the previous case. The request transferring section 2 creates a temporary ID. Here, it is assumed that "2" is assigned as a temporary ID. The request transferring section 2 transfers the created temporary ID "2", the original inquiry (M1, M1, 4322, A, bar.private.com, null), and the obtained server group management table (FIG. 5) to the request management section 7 so as to create a request management table.

Receiving this creation request, the request management section 7 adds a new tuple to the request management table. As a result, the request management table becomes as shown in FIG. 4. The request management section 7 transmits the created temporary ID "2" to the response selection section 15. The response selection section 15 adds a new tuple to the temporary inquiry processing table.

Here, when the current time is assumed to be "CT2", the temporary inquiry processing table becomes as shown in FIG. 9.

The request transferring section 2 makes an inquiry to the cache management section 6 about whether or not there is a response for the original inquiry (M1, M1, 4322, A, bar.private.com, null) with regard to each DNS server, that is, DA1 and DE1, on the basis of the obtained server group management table (FIG. 5).

Since no cache matching this inquiry is present in the cache table, the cache management section 6 returns a null to inquiries for both. Since the response from the cache management section 6 is a null, the request transferring section 2 creates temporary inquiries with regard to the DNS servers DA1 and DE1. There are two temporary inquiries which are created: (A1NE1, DA1, 2, A, bar.private.com, null) and (A1NE1, DE1, 2, A, bar.private.com, null).

As a result, since it can be confirmed that the packet reaches the DNS server DA1 through the line of the modem, it is possible for the terminal M1 to receive a response from the DNS server DA1. Here, it is assumed that the response of the DNS server DA1 is (DA1, A1NA1, 2, A, bar.private.com, A3NA1) and that the response of the DNS server DE1 is (DE1, A1NE1, 2, A, bar.private.com, NXDomain).

Also, it is assumed that the packet has reached the terminal M1 earlier in the DNS server DA1. When the response of the DNS server DA1 reaches the terminal M1, the response receiving section 14 receives this response. Here, since the temporary ID "2" is present in the request management table, this temporary response is transferred to the response selection section 15.

The server management section 4 outputs the address of the DNS server DA1 and a failure-counter erasure request of this server, and sets the failure counter of the DNS server DA1 to zero.

The response selection section 15 receives the temporary response and obtains the temporary ID. Then, a tuple corresponding to the temporary ID is obtained from the temporary inquiry processing table (FIG. 8). Then, a server management table is obtained, and the failure counter is updated. As a result, the failure counter of the DNS server DA1 is set to 0.

Next, since the cache capability flag for the DNS server DA1 within the server group management table within the temporary inquiry processing table (FIG. 8) is "true", a request is made to the cache management section 6 so that this temporary response is cached. As a result, the cache management table becomes as shown in FIG. 7.

Next, a request for a tuple of the request management table for the temporary ID "2" is made to the request management section 7. Here, since the optimum response termination flag is "false", the response selection section 15 adds this temporary response to the tentative storage table.

Next, a temporary response for the temporary ID "2" is duplicated from the temporary response tentative storage table. As a result, (DA1, A1NA1, 2, A, bar.private.com, A3NA1) is obtained.

The set of these temporary responses and the server information group management table (FIG. 5) are transferred to the algorithm processing section 12. The algorithm processing section 12 obtains the inquiry type "A", shows this to the algorithm management section 10, and obtains an algorithm. Although the temporary responses from all the DNS servers are not received, since this temporary response is a good temporary response and there is no DNS server having a higher priority, (DA1, A1NA1, 2, A, bar.private.com, A3NA1) is the temporary optimum response, and this is returned to the response selection section 15.

Since the temporary optimum response is obtained, the response selection section 15 deletes a temporary response matching the temporary ID "2" from the temporary response tentative storage table, and informs the request management section 7 of the optimum response termination of the tuple of the request management table for the temporary ID "2".

As a result, the optimum response termination flag of the tuple of the request management table for the temporary ID "2" becomes "true".

Next, this temporary optimum response is converted into an optimum response. The optimum response becomes (M1, M1, 4322, A, bar.private.com, A3NA1), and this is transferred to the request sending section 13.

As a result, even when the terminal M1 is connected to a network having a different DNS tree, it is possible to obtain an optimum response in each connection.

As has thus been described, according to the present invention, if connection to a DNS server is possible for an inquiry belonging to a tree formed of different DNS servers, it is possible to obtain a response immediately. Also, in a case where connection to a predetermined DNS server is impossible, a response from the DNS server after a set time is not expected. Therefore, even if connection to the DNS server is formed in any manner, it is possible for a user to obtain a more appropriate response at a high response speed in a range in which inquiries can be made.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A domain name system inquiry apparatus comprising:
   current location information receiving means for receiving location information of the apparatus itself on a connected network;
   current location management means for storing location information received by said current location information receiving means;
   server information receiving means for receiving server information regarding plural domain name servers to which an inquiry can be made;
   server management means for storing the server information received by said server information receiving means;
   request receiving means for receiving a domain name inquiry request from a client;
   request transferring means for creating first and second domain name inquiry requests based on the domain name inquiry request received by said request receiving means and at least one of said location information and said server information, and for transferring said first and second domain name inquiry requests to first and second domain name servers, respectively;
   response receiving means for receiving a first domain name inquiry response to the first domain name inquiry request from the first domain name server and a second domain name inquiry response to the second domain name inquiry request from the second domain name server;
   request responding means for selecting the second domain name inquiry response based at least in part on server information corresponding to the first and second domain name servers and for sending the second domain name inquiry response corresponding to the second domain name server to said client; and
   means for selecting the second domain name inquiry response further based on a failure counter included in the server information corresponding to the first domain name server exceeding a predetermined value.

2. A domain name system inquiry method comprising:
   a first step of receiving location information of an apparatus itself on a connected network;
   a second step of storing the location information received in said first step;
   a third step of receiving server information regarding plural domain name servers to which an inquiry can be made;
   a fourth step of storing the server information received in said third step;
   a fifth step of receiving a domain name inquiry request from a client;
   a sixth step of creating first and second domain name inquiry requests based on the domain name inquiry request received in said fifth step and at least one of said location information and said server information, and of transferring said first and second domain name inquiry requests to the first and second domain name servers, respectively;
   a seventh step of receiving a first domain name inquiry response to the first domain name inquiry request from the first domain name server and a second domain name inquiry response to the second domain name inquiry request from the second domain name server;
   an eighth step of selecting the second domain name inquiry response based at least in part on server information corresponding to the first and second domain name servers and of sending the second domain name inquiry response corresponding to the second domain name server to said client; and
   selecting the second domain name inquiry response further based on a failure counter included in the server information corresponding to the first domain name server exceeding a predetermined value.

3. A computer-readable recording medium having program instructions which, when executed by a processor to perform a domain name system inquiry, results in performance of the steps comprising:
   a first step of receiving location information of an apparatus itself on a connected network;
   a second step of storing the location information received in said first step;
   a third step of receiving server information regarding plural domain name servers to which an inquiry can be made;
   a fourth step of storing the server information received in said third step;
   a fifth step of receiving a domain name inquiry request from a client;
   a sixth step of creating first and second domain name inquiry requests based on the domain name inquiry request received in said fifth step and at least one of said location information and said server information, and of transferring said first and second domain name inquiry requests to the first and second domain name servers, respectively;
   a seventh step of receiving a first domain name inquiry response to the first domain name inquiry request from the first domain name server and a second domain name inquiry response to the second domain name inquiry request from the second domain name server;
   an eighth step of selecting the second domain name inquiry response based at least in part on server information corresponding to the first and second domain name servers and sending the second domain name inquiry response corresponding to the second domain name server to said client; and program instructions resulting in the step of selecting the second domain name inquiry response further based on a failure counter included in the server information corresponding to the first domain name server exceeding a predetermined value.

4. A domain name system inquiry apparatus comprising:

current location information receiving mechanism configured to receive location information of the apparatus itself on a connected network;

current location management mechanism configured to store location information received by said current location information receiving mechanism;

server information receiving mechanism configured to receive server information regarding plural domain name servers to which an inquiry can be made;

server management mechanism configured to store the server information received by said server information receiving mechanism;

request receiving mechanism configured to receive a domain name inquiry request from a client;

request transferring mechanism configured to create first and second domain name inquiry requests based on the domain name inquiry request received by said request receiving mechanism and at least one of said location information and said server information, and to transfer said first and second domain name inquiry requests to the first and second domain name servers, respectively;

response receiving mechanism configured to receive a first domain name inquiry response to the first domain name inquiry request from the first domain name server and a second domain name inquiry response to the second domain name inquiry request from the second domain name server;

request responding mechanism configured to select the second domain name inquiry response based at least in part on server information corresponding to the first and second domain name servers and to send the second domain name inquiry response corresponding to the second domain name server to said client; and a selecting mechanism configured to select the second domain name inquiry response further based on a failure counter included in the server information corresponding to the first domain name server exceeding a predetermined value.

5. A domain name system inquiry apparatus comprising:

server information receiving means for receiving server information regarding plural domain name servers to which an inquiry can be made;

server management means for storing the server information received by said server information receiving means;

request receiving means for receiving a domain name inquiry request from a client, said domain name inquiry request including a host name and a request for a domain name server to transmit a domain name inquiry response;

request transferring means for transferring the domain name inquiry request to first and second domain name servers based on said server information;

response receiving means for receiving a first domain name inquiry response from the first domain name server and a second domain name inquiry response from the second domain name server, the first and second domain name inquiry responses each including an IP address indicator including (i) an IP address corresponding to the host name or (ii) an indication that the IP address corresponding to the host name is unknown, wherein the IP address indicator in the first domain name inquiry response is different than the IP address indicator in the second domain name inquiry response;

request responding means for selecting the second domain name inquiry response based at least in part on the server information corresponding to the first and second domain name servers and for sending the second domain name inquiry response corresponding to the second domain name server to said client; and means for selecting the second domain name inquiry response further based on a failure counter included in the server information corresponding to the first domain name server exceeding a predetermined value.

6. A domain name system inquiry method comprising:

receiving server information regarding plural domain name servers to which an inquiry can be made;

storing the received server information;

receiving a domain name inquiry request from a client, said domain name inquiry request including a host name and a request for a domain name server to transmit a domain name inquiry response;

transferring the received domain name inquiry request to first and second domain name servers based on said server information;

receiving a first domain name inquiry response from the first domain name server and a second domain name inquiry response from the second domain name server, the first and second domain name inquiry responses each including an IP address indicator including (i) an IP address corresponding to the host name or (ii) an indication that the IP address corresponding to the host name is unknown, wherein the IP address indicator in the first domain name inquiry response is different than the IP address indicator in the second domain name inquiry response;

selecting the second domain name inquiry response based at least in part on the server information corresponding to the first and second domain name servers and sending the second domain name inquiry response corresponding to the second domain name server to said client; and selecting the second domain name inquiry response further based on a failure counter included in the server information corresponding to the first domain name server exceeding a predetermined value.

7. A computer-readable recording medium having a program instructions which, when executed by a processor to perform a domain name system inquiry, results in performance of the steps comprising:

receiving server information regarding plural domain name servers to which an inquiry can be made;

storing the received server information;

receiving a domain name inquiry request from a client, said domain name inquiry request including a host name and a request for a domain name server to transmit a domain name inquiry response;

transferring the received domain name inquiry request to first and second domain name servers based on said server information;

receiving a first domain name inquiry response from the first domain name server and a second domain name inquiry response from the second domain name server, the first and second domain name inquiry responses each including an IP address indicator including (i) an IP address corresponding to the host name or (ii) an indication that the IP address corresponding to the host name is unknown, wherein the IP address indicator in the first domain name inquiry response is different than the IP address indicator in the second domain name inquiry response; selecting the second domain name inquiry response based at least in part on the server information corresponding to the second domain name server to said client; and selecting the second domain name inquiry response further based on a failure counter included in the server information corresponding to the first domain name server exceeding a predetermined value.

8. A domain name system inquiry apparatus comprising:

a server information receiving mechanism configured to receive server information regarding plural domain name servers to which an inquiry can be made;

a server management mechanism configured to store the server information received by said server information receiving mechanism;

a request receiving mechanism configured to receive a domain name inquiry request from a client, said domain name inquiry request including a host name and a request for a domain name server to transmit a domain name inquiry response;

a request transferring mechanism configured to transfer the domain name inquiry request to first and second domain name servers based on said server information;

a response receiving mechanism configured to receive a first domain name inquiry response from the first domain name server and a second domain name inquiry response from the second domain name server, the first and second domain name inquiry responses each including an IP address indicator including (i) an IP address corresponding to the host name or (ii) an indication that the IP address corresponding to the host name is unknown, wherein the IP address indicator in the first domain name inquiry response is different than the IP address indicator in the second domain name inquiry response;

a request responding mechanism configured to select the second domain name server based at least in part on the server information corresponding to the first and second domain name servers and to send the second domain name inquiry response corresponding to the second domain name server to said client; and a selecting mechanism configured to select the second domain name inquiry response further based on a failure counter included in the server information corresponding to the first domain name system server exceeding a predetermined value.

* * * * *